(12) United States Patent
Faldu et al.

(10) Patent No.: US 11,416,558 B2
(45) Date of Patent: Aug. 16, 2022

(54) SYSTEM AND METHOD FOR RECOMMENDING PERSONALIZED CONTENT USING CONTEXTUALIZED KNOWLEDGE BASE

(71) Applicant: INDIAVIDUAL LEARNING PRIVATE LIMITED, Karnataka (IN)

(72) Inventors: Keyur Faldu, Bangalore (IN); Achint Thomas, Bangalore (IN); Aditi Avasthi, Bangalore (IN)

(73) Assignee: INDIAVIDUAL LEARNING PRIVATE LIMITED, Bangalore (IN)

( * ) Notice: Subject to any disclaimer, the term of this patent is extended or adjusted under 35 U.S.C. 154(b) by 265 days.

(21) Appl. No.: 16/586,512

(22) Filed: Sep. 27, 2019

(65) Prior Publication Data

US 2020/0311152 A1    Oct. 1, 2020

(30) Foreign Application Priority Data

Mar. 29, 2019   (IN) ............................. 201941012401

(51) Int. Cl.
| | | |
|---|---|---|
| *G06F 16/903* | (2019.01) | |
| *G06F 16/906* | (2019.01) | |
| *G06F 16/9035* | (2019.01) | |
| *G06K 9/62* | (2022.01) | |

(52) U.S. Cl.
CPC ...... *G06F 16/90348* (2019.01); *G06F 16/906* (2019.01); *G06F 16/9035* (2019.01); *G06K 9/6256* (2013.01)

(58) Field of Classification Search
CPC ............. G06F 16/90348; G06F 16/906; G06F 16/9035; G06K 9/6256

USPC ........................................................ 707/752
See application file for complete search history.

(56) References Cited

U.S. PATENT DOCUMENTS

| | | | | |
|---|---|---|---|---|
| 7,027,974 B1* | 4/2006 | Busch | .................. | G06F 40/284 704/4 |
| 7,139,757 B1* | 11/2006 | Apollonsky | ........ | G06F 16/9535 707/804 |
| 8,140,545 B2* | 3/2012 | Iselborn | .............. | G06F 16/9024 717/122 |
| 2008/0159317 A1* | 7/2008 | Iselborn | .............. | G06F 16/9024 707/E17.011 |
| 2009/0037335 A1* | 2/2009 | McNamara | ............ | G06Q 20/10 705/54 |
| 2011/0177483 A1 | 7/2011 | Needham et al. | | |
| 2015/0248413 A1 | 9/2015 | Ratnavale | | |

(Continued)

*Primary Examiner* — Shahid A Alam
(74) *Attorney, Agent, or Firm* — Maschoff Brennan

(57) ABSTRACT

A system for recommending content for use, by a learner is provided. The system includes a processor in communication with a memory. The memory stores a knowledge base. The processor is configured for identifying a subset of the knowledge base, based on the academic context of the learner and for identifying a first set of content tagged to interlinked nodes of the subset of knowledge base. The processor is configured for identifying a second set of content from the first set of content, based on the behavioral context and the characteristics of the learner. The processor is configured for identifying a learning path for the learner, based on a learning strategy for the learner and a score assigned to a concept. The processor is configured for structuring the identified second set of content for recommending to the learner, based on the identified learning path.

11 Claims, 6 Drawing Sheets

(56) References Cited

U.S. PATENT DOCUMENTS

| | | | | |
|---|---|---|---|---|
| 2016/0321585 A1* | 11/2016 | Saraswat | .......... | G06Q 10/06311 |
| 2016/0321939 A1* | 11/2016 | Anantha | .................. | G09B 7/04 |
| 2017/0076620 A1 | 3/2017 | Thompsen Primo et al. | | |
| 2018/0197428 A1* | 7/2018 | Baphna | .................... | G09B 7/00 |
| 2019/0347955 A1* | 11/2019 | Paramoure | ............... | G09B 7/00 |

* cited by examiner

SYSTEM AND METHOD FOR RECOMMENDING PERSONALIZED CONTENT USING CONTEXTUALIZED KNOWLEDGE BASE

PRIORITY STATEMENT

The present application hereby claims priority to Indian patent application number 201941012401 filed 29 Mar. 2019, the entire contents of which are hereby incorporated herein by reference.

FIELD

The present disclosure generally relates to online and interactive learning management systems and more particularly to a system and method for recommending structured, contextualized, personalized, content for use, by a learner.

BACKGROUND

With advancements in technology, individuals are being exposed to digital forms of various traditional methods. For instance, individuals such as learners can study different courses online instead of opting for classroom studying. With more and more individuals getting connected through heterogeneous devices such as mobile phones, smart phones, tablets, digital TVs, laptops, PCs, etc., online learning management systems (LMS) and content management systems (CMS) are being used increasingly by corporations, government agencies, and educational institutions. Moreover, the learners, such as students, may utilize any electronic device as interactive learning tool for adaptive learning.

Different individuals such as learners may be interested in different information. However, the existing methods provide content to the learners by identifying only their interest levels. Conventional approaches of the online learning management systems (LMS) focus only on learner's explicit actions or requests, for example, clicks on web pages, tags with like/dislike in association with web pages, or a search query including a certain topic.

SUMMARY

This summary is provided to introduce a selection of concepts in simple manners that are further described in the detailed description of the disclosure. This summary is not intended to identify key or essential inventive concepts of the subject matter nor is it intended to determine the scope of the disclosure.

Existing solutions for recommending content to the learners based on personalization process do not address the issue of providing the content to the learners in a structured way. Several factors related to learners, such as learning adaptability, learning needs, prior knowledge, the amount of time the learner can spend to learn the content, the grade the learner is studying in, the age of the learner, pedagogy, the learning strategy for the learner, the learner's behavioral traits, historical empirical evidence on learning outcomes of the learner, conceptual interconnections in a knowledge base and many such factors are not considered while providing or recommending content to the learner.

To overcome at least some of the above mentioned problems, a system and a method configured for structuring content for recommending to a learner is needed. A system and method is needed for recommending personalized, structured and contextualized content to the learner.

Briefly, according to an exemplary embodiment a system for recommending content to a learner, for use by the learner, is provided. The system includes a processor in communication with a memory. The memory stores a knowledge base. The memory also stores the academic context of the learner, the behavioral context of the learner, and the learner's characteristics. The processor is configured for identifying a subset of the knowledge base, based on the academic context of the learner and further configured for identifying a first set of content tagged to one or more interlinked nodes of the subset of knowledge base. The processor is also configured for identifying a second set of content from the first set of content, based on the behavioral context of the learner and the characteristics of the learner. In addition, the processor is configured for identifying a learning path for the learner, based on a learning strategy for the learner and a score assigned to a concept. Further, the processor is configured for structuring the identified second set of content for recommending to the learner, based on the identified learning path and recommending the structured content to the learner.

Briefly, according to an exemplary embodiment, a method for recommendations is provided. The method includes, providing, by a processor, through a user interface, a structured content to a learner for use by the learner. The processor is coupled to a memory, wherein the memory stores a plurality of modules to be executed by the processor. The modules in the processor are configured for identifying a subset of the knowledge base, based on the academic context of the learner and identifying a first set of content tagged to one or more interlinked nodes of the subset of knowledge base. The modules in the processor are configured for identifying a second set of content from the first set of content, based on the behavioral context of the learner and one or more characteristics of the learner. The modules in the processor are configured for identifying a learning path for the learner, based on a learning strategy for the learner and a score assigned to a concept. In addition, the modules in the processor are configured for structuring the identified second set of content for recommending to the learner, based on the identified learning path and recommending the structured content to the learner. The modules in the processor are configured for recommending the structured content to the learner.

The summary above is illustrative only and is not intended to be in any way limiting. Further aspects, exemplary embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein.

Figure 1:
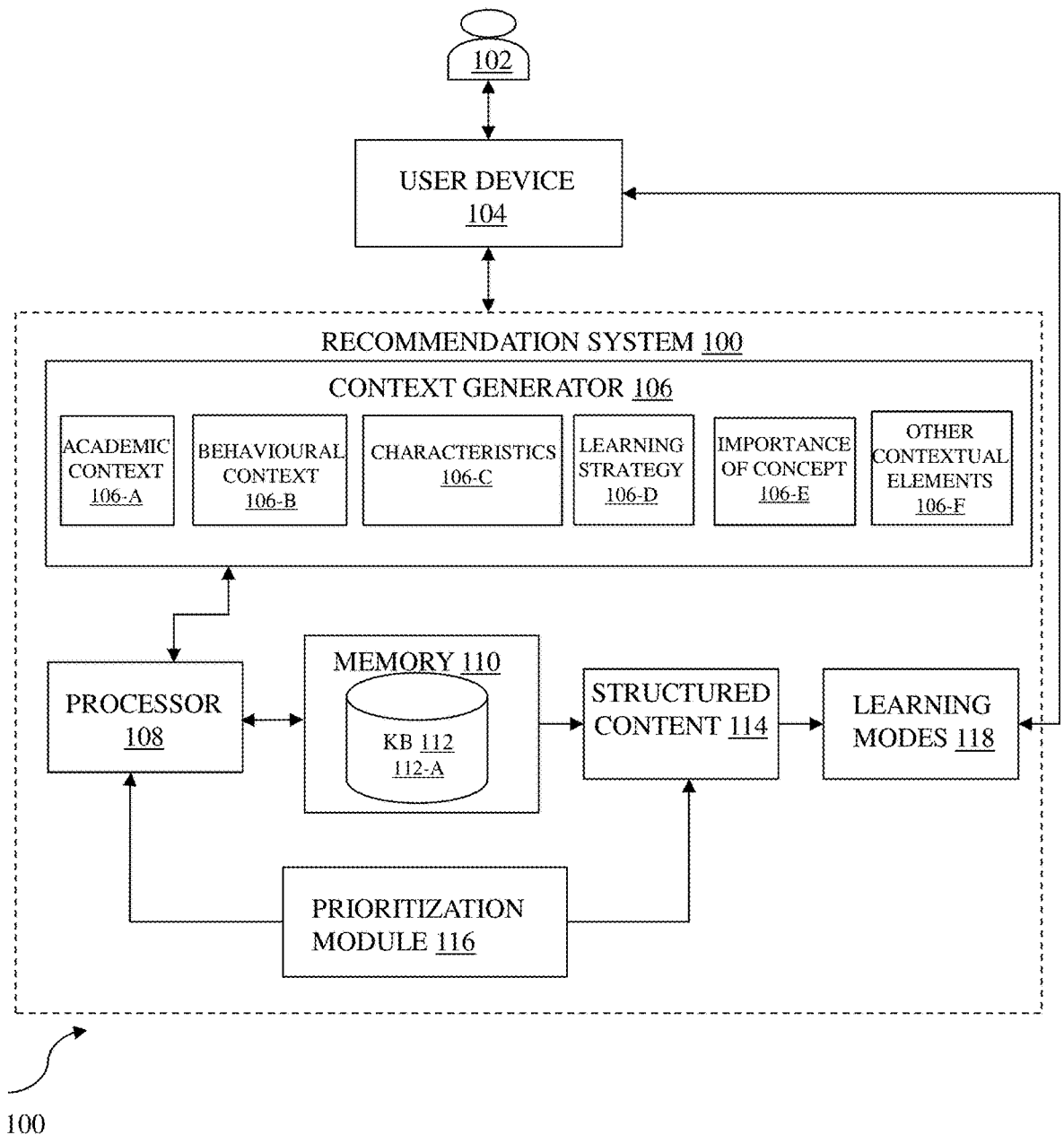
FIG. 1 illustrates a system for recommending content to a learner by the learner, according to an embodiment of the present disclosure.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

Embodiments of the present disclosure particularly disclose a system and a method configured for structuring a content for recommending to a learner for use, by the learner. In one embodiment, the content described herein may be a learning content. In another embodiment, the content described herein may be academic content. The learning content may include academic content. The learning content may also include non-academic content, for example vocational training and the like. It is to be noted, that recommending described herein refers to displaying of the structured content on a user device to a learner for use by the learner. It is to be noted, that the structured content described herein refers to the information or content that is organized in a predictable way and is usually classified with metadata. It is to be noted, that the structured content described herein refers to the information or content that is usually tagged using metadata and may be organized in a flat or hierarchical manner. Further, it is to be noted that the term knowledge base described herein, is known in the field of the art to which this disclosure belongs and is a method for storing complex structured and unstructured information used by a computer system.

The system and method as disclosed herein are for contextualizing the existing knowledge base to identify a subset of the knowledge base, based on the academic context of the learner and further identifying a first set of content tagged to one or more nodes of the subset of knowledge base. Further, the system and method as disclosed herein, is for imposing one or more contextual elements on the subset of the knowledge base for structuring the content for recommending to the learner. The knowledge base comprises content arranged as a topology comprising a plurality of interlinked nodes, wherein, each node represents a concept. The system and method are also for prioritizing the structured content for recommending for use by the learner.

In some embodiments, the word 'user', 'learner', 'student' and 'individual' used in the description may reflect the same meaning and may be used interchangeably. Embodiments of the present invention will be described below in detail with reference to the accompanying figures.

FIG. 1 is a block diagram of a recommendation system 100 configured for recommending content to a learner 102, according to an embodiment of the present disclosure. In particular, the FIG. 1 illustrates the learner 102, a user device 104, a context generator 106, a processor 108, a memory 110 storing a knowledge base 112 and a subset of knowledge base 112-A, a structured content 114, a prioritization module 116 and learning modes 118. The context generator 106 comprises a plurality of contextual elements such as an academic context 106-A, a behavioral context 106-B, one or more characteristics 106-C, a learning strategy 106-D, importance of concept 106-E and other contextual elements 106-E associated with the learner 102. Each block is explained in detail further below. It is to be noted that the user 102 and the user device 104 are not a part of the disclosed system and are shown to clarify the relevance of the system to the user 102, through the user device 104.

It is to be noted that the FIG. 1 is explained with respect to a single user, for example the learner 102, however, it should be noted that the present disclosure can be similarly applied to multiple users with each of the users receiving recommended content personalized to each user. Further, the learner 102 may communicate with the recommendation system 100 using one or more user devices (exemplary user device 104 through a network—not shown). Examples of the user devices 104 include, but are not limited to, a mobile phone, a computer, a tablet, a laptop, a palmtop, a handheld device, a telecommunication device, a personal digital assistant (PDA), and the like. Examples of the network include, but are not limited to, a mobile communication network, a Local Area Network (LAN), a Wireless Local Area Network (WLAN), a Wide Area Network (WAN), internet, a Small Area Network (SAN), and the like.

The recommendation system 100 is configured for providing personalized solutions to the learners 102 for recommending structured and prioritized content, based on contextualization. The content referred herein may be in the form of text, a video, an audio, a graphic. The contextualization of the content in the knowledge base 112 based on the one or more contextual elements 106-A-N of the learner 102 plays a vital role in providing personalized solutions for recommending content to the learners 102. Embodiments of the present disclosure particularly disclose the recommendation system 100 configured to contextualize the knowledge base 112 using the one or more contextual elements 106-A-N for structuring the content.

Referring to FIG. 1, the system 100 includes the processor 108 in communication with the memory 110. The memory 110 includes the knowledge base 112. The knowledge base 112 symbolizes knowledge without context. In one embodiment, knowledge base 112 hosts content (knowledge data) which is a discrete collection of concepts with connections and relationships between them and can be defined as data without context data. The content is arranged as a topology comprising a plurality of interlinked nodes, wherein, each node represents a concept.

In one embodiment, the processor 108 is configured for structuring the content hosted on the knowledge base 112 and recommending the structured content 114 to the learner 102 based on the one or more contextual elements 106-A-N associated with the learners 102. The context generator 106 is configured for generating one or more contextual elements 106-A-N for the learner 102 and store the generated contextual elements 106-A-N in the memory 110. In one embodiment, the contextual elements includes an academic context 106-A of the learner 102 referred as learner's academic context 106-A, a behavioral context 106-B of the learner 102 referred as the learner's behavioral context 106-B, the one or more characteristics 106-C of the learner 102, the learning strategy 106-D for the learner 102, the importance of concept 106-E and other contextual elements 106-E associated with the learner 102.

The paragraphs below explain in detail, the steps executed by the processor 108 for structuring the content for recommending content to the learner 102 based on the one or more contextual elements 106-A-N associated with the learner 102.

In one embodiment, the processor 108 is configured for identifying a subset of the knowledge base 112, based on the learner's academic context 106-A. It is to be noted that the identified subset of knowledge base shall be referred by reference numeral 112-A. Further, the processor is configured for identifying a first set of content tagged to one or more nodes of the knowledge base 112-A. In one example, the learner's academic context 106-A is determined based on at least one of a learning context and a consumption context of the learner 102.

In one example, the learning context may be driven by data such as learner's level of study. It is to be noted that the level of study may be the number of academic years of study a student has completed. In various systems of education it may be referred to as standard. For example seventh standard. This means the learner has studied for seven academic years and is in the seventh year of study. The other terms used are grade, class, year, form, standard, etc. Further the academic year may be divided into semesters or trimesters and so on. The academic context 106-A then would be, seventh standard—second semester, for example. Hereinafter various terms may have been used in the description. Based on the explanation above, what is meant will be evident to the person skilled in the art.

In one example, the learning context may be driven by data such as learner's goal and examination to be attended by the learner 102. It may also be a combination of one or more of level, goal, and examination of the learner 102. A learner's goal may be obtaining a certain percentage of marks or a CPA or some such academic measure, for instance.

The learning context invokes the appropriate depth and width associated the concept of the content in the knowledge base 112-A. The depth of a particular concept can be explained considering the example of methane. For example, the depth of the concept of "methane" supports multiple occurrences of the same concept at a different areas or fields of the concept. For example, methane as gas, or methane as fuel, or methane as pollutant, or methane as a hydrocarbon. With respect to each occurrence of a concept at a particular depth, the concept may contain any number of attributes representing the width of the concept. For instance in the case of methane, the attributes representing the width could be; physical properties, chemical properties, chemical composition, molecular structure, its stereochemistry, the bonds connecting the elements, the valencies of the constituent elements, synthesis of methane, analysis of methane, its natural occurrence, and detection, and so on.

In another example, the consumption context for the learner 102 may capture specific instances of publishers that the learner 102 prefers, book and language preferences, institution in which the learner 102 is pursuing education, and the like.

The learner's academic context 106-A over the content in the knowledge base 112 contextualizes the learner's learning content, other learners' (for example other students) historical engagement and learning outcomes data. In one example, the learning content may be contextualized by applying academic context 106-A, which enables the processor 108 to identify the learning materials, practice and assessment questions, videos, and the like for a desired academic context 106-A. The learning content is hosted on knowledge base 112, and academic context 106-A of the learner 102 invokes a relevant subset of the knowledge base (112-A), and hence learning content is contextualized. For example, the learning context would enable filtering of practice and assessment questions of particular difficulty, bloom level, and set of concepts at desired depth pertaining to the given academic context 106-A for the learner 102. The bloom level may be the level of the depth to which the learner 102 should earn the subject in the learner's learning context.

In another example, the student's historical engagement with a concept and learning outcome with reference to that concept may be contextualized based on the student's engagement with the learning content, along with the learning outcomes for the concepts of knowledge base 112-A. Learning outcomes are captured on the knowledge base 112 and are further contextualized depending on the student's academic context 106-A. For example, the student's engagement data for the practice sessions would be questions attempted, questions not-attempted, time spent per question, total time spent, videos watched, solutions viewed, hints used, and the like. Furthermore, the learning outcome for the learner 102 may be determined based on the parameters such as student's accuracy of answers, probable right answers by chance (flukes), careless mistakes, incorrect answers in spite of spending more than average or ideal time (overtime incorrect) and the like.

Furthermore, in one embodiment, the processor 108 is configured for identifying a second set of content from the first set of content, based on the learner's behavioral context 106-B and the one or more characteristics 106-C of the learner 102. The second set of identified content is hosted by the contextualized knowledge base 112-A, which is a relevant and contextualized subset of the knowledge base 112 and is identified based on the learner's behavioral context 106-B and the one or more characteristics 106-C of the learner 102.

The behavioral context 106-B of the learner 102 is determined based on the behavioral attributes of the learner 102 with reference to a node of the subset of the knowledge base 112-A relative to the behavioral attributes of each of a plurality of other learners, with reference to the node. For example, the behavioral context 106-B captures the behavioral traits of the learner 102 both across other users and specific to the individual user over each node of the content topology of the knowledge base 112-A. Furthermore, the behavioral context 106-B over the content in the knowledge base 112-A contextualizes the student's historical behavioral traits as measured using behavioral attributes like flukes, careless mistakes, overtime incorrect, and the like. The behavioral context is described in detail in India patent application: 201941012400 entitled "System and method for behavioural analysis and recommendations" filed on the Mar. 29, 2019, the relevant content of which is incorporated herein by reference.

The one or more characteristics 106-C of the learner 102 are determined based on, at least one of the learner's academic ability, the behavioral attributes of the learner, the efforts expended by the learner 102 for learning a particular concept and the learner's predisposition towards a concept. The content for the learner 102 is contextualized for a given academic context 106-A based on the learner's academic ability, the behavioral attributes of the learner, the effort expended by the learner 102 for learning the concept and the learner's predisposition towards a concept.

In one example, to measure the academic ability, the academic strengths and weaknesses of the learner 102 are captured. The data sources for capturing the academic strengths and weaknesses of the learner 102 may include, but not limited to, clickstream data, optical mark recognition or optical mark reading (OMR) sheets for assessments. For example, the student's academic performance in a given academic context 106-A can be measured at finer levels, that is, the concept, topic, chapter, subject, examination, skills, and the like, which constitute the academic context 106-A of the student 102.

The identification of the subset of the knowledge base 112-A for the learner 102, based on contextualization of the academic context 106-A would allow the recommendation system 100 to measure a student's academic ability differently for different depths and widths of concepts—as described earlier. Student's accuracies are also stored in an aggregated manner from individual concept nodes to broader logical groupings (group nodes)—topic, chapter, unit, subject, grade, examination, and the like.

Further, the recommendation system 100 is configured to take into account the fact that human memory is fallible. This means that the user 102 who has 100% accuracy on a particular concept or set of concepts for the content at the knowledge base 112, will not retain that accuracy after some period of time due to lack of practice, learning other material, and the like. So, each concept node or set of concepts would maintain the "time decayed accuracy" for each user 102. Time decayed accuracy would be computed for each user 102 on a given academic context 106-A at all finer levels of the content, that is, concept, topic, chapter, subject, examination, skills, and the like.

Moreover, computing time decayed accuracy on each user activity from raw data would be computationally expensive. Therefore, the "Efficient exponential aggregation" allows the recommendation system 100 to weigh recent accuracy higher, proportional to the number of attempts (saturating at attempts more than a predetermined threshold). Exponential average calculated would allow the system 100 to update decayed accuracy in incremental fashion and further memory decay coefficient will allow the system 100 to configure the different rate of decay based on student's 102 cohorts.

In another example, the learner's behavioral traits are determined based on the behavioral attributes of the learner 102. The behavioral attributes are quantified by behavioral parameters. For instance, certain user 102 may tend to lack focus and be careless and may make mistakes because of that. Furthermore, this carelessness trait of the learner 102 may manifest itself to different degrees based on the content they are engaging with. By capturing whether a user 102 gives an incorrect answer in very low attempt time, the system 100 can measure a "careless mistake" parameter value. Similarly, other behavioral parameters can be measured for flukes, overtime attempts, stamina, etc. Each node on the content topology of the knowledge base 112-A is contextualized with the averaged behavioral parameter value for each behavioral trait across attempts of every student with reference to a node. Further, each node on the content topology of the knowledge base 112-A is also contextualized with the behavioral parameter value for each behavioral trait for each user 102.

In another example, the effort expended by the learner 102 is determined based on the amount of effort the student 102 has put in while studying. The effort is an important characteristic of the learner 102 to contextualize, since it may assist later on during recommendation. Students with high academic ability need not expend much effort to improve their score by some fixed amount, for instance. The data sources for determining the effort expended by the user 102 may include, but not limited to, clickstream data and offline data. In one example, the clickstream data is the data from which the accuracy of attempts on any level of content in the knowledge base 112-A may be obtained. For example, the attempt data during study, practice and test sessions may be utilized. In another example, the offline data may include attendance sheets from schools and syllabus schedule in the school.

Furthermore, identification of the one or more content from knowledge base 112-A, based on the characteristic 106-C of the learner 102, such as effort expended enables the recommendation system 100 to determine the method to recommend content to user 102 and devise strategies around recommendations. The goal of the recommendation system 100 is always to work within the constraints of time and optimize for some target output. Time decayed accuracy would be computed for each user 102 on a given academic context 106-A at all finer levels of content, that is, concept, topic, chapter, subject, examination, skills, and the like. Further, the recommendation system 100 takes into account the fact that effort decays over time. This means that the user 102 who has put 100% effort on some concept or set of concepts of the knowledge base 112 may not retain the accuracy of concepts learned after some period of time due to lack of practice, learning other material, etc. So, the student 102 is expected to put the required effort again. Hence, it is important to decay or reduce historical effort. So, each concept or all finer levels of academic context 106-A would have "time decayed effort" for each user 102 in a similar fashion to "time decayed accuracy".

As mentioned above, the content for the learner 102 is contextualized for a given academic context 106-A based on the academic ability of the learner, the behavioral attributes of the learner, the effort expended by the learner 102 for learning the concept and the learner's predisposition towards a concept. In another example, the learner's predisposition towards a concept (the student's preferences) may include student's profiling. The student profiling learns the students likes, dislikes, preferences on different properties (practice, test, learn, etc.), or type of content (that is, types of videos, types of learning materials, etc.), etc. For example, consistently successful learners engage most with test property, whereas less successful and struggling learners engage most with practice.

In one embodiment, the processor 108 is configured for further identifying a learning path for the learner 102, based on learning strategy 106-D for the learner 102 and a score assigned to the concept. The score is assigned to the concept based on its importance 106-E. In one embodiment, the learning path is a path to learn a concept from the current state of student's ability on concepts. Further, the subsequent paragraphs disclosed herein describe the methodologies to identify learning paths using the importance of concepts 106-E and learning strategy 106-D for maximizing learning outcomes for the learner 102.

Importance of a concept 106-E is computed by assigning a score, based on central concepts and assessment questions from preceding years, for a particular content identified as the second set of content hosted by knowledge base 112-A.

In one example, a score is assigned to a concept by classifying the concept as a central concept, a peripheral concept, the frequency of appearance of the concept in assessment questions from preceding years and the like. In one example, the central concepts comprise learning data of a student 102. Learning is a continuum, where students build expertise on fundamental concepts and they move to advanced concepts. The learning path for a concept is a list of ordered fundamental concepts, student 102 is required to learn in a given sequence. Top few concepts which are part of maximum learning paths are called as central concepts, as high numbers of learning paths traverse through these central concepts.

In another example, before any examination, a good method to know which concepts are important is to review the question papers of preceding examinations. If a concept is present in those question papers, there is a high likelihood that it is an important concept. Concepts which occur maximum number of times in those question papers may have a greater likelihood of being considered important than those which occur fewer times.

The identification of a learning path for the learner 102 is user-specific and depends on the user's state of academic ability with regard to concepts. Learning paths are goal or grade agnostic. For instance, the learner 102 who is having difficulties in learning an advanced concept in the 10th grade may have to first understanding the basic concepts from say, the 7th grade, on which it is dependent before coming back to the advanced concept.

In one embodiment, the processor 108 is configured for structuring the identified second set of content from the hosted content on knowledge base 112-A for recommending to the learner 102. As described above, the identified content based on the learner's academic context 106-A, the learner's behavioral context 106-B, the characteristics 106-C of the learner 102, and the identified learning path based on the learning strategy 106-D for the learner 102 and the importance of concepts 106-E. The recommendation system 100 is configured to recommend the content to the learner 102, based on the structured content 114.

In one exemplary embodiment, other contextual elements 106-E of the learner 102 such as, learning adaptability, learning needs, prior knowledge, the amount of time the learner 102 is able to spend to learn a large amount of content, the age of the learner 102, pedagogy, historical empirical evidence on learning outcomes of the learner, conceptual interconnections in the knowledge base 112, and many more such factors that influence the context of the learner 102 are considered for identification of the second set of content for structuring the content for recommendation.

In addition, the structured content 114 is recommended to the learner 102, by sorting and prioritizing the content, based on one or more parameters associated with each of the contents of the second set of content, using the prioritization module 116. The one or more parameters are determined based on at least one of the score assigned to the concept and difficulty level of the concept, measured impact on learning outcomes, proficiency of the learner in learning the concept, and the behavioral context of the learner 102.

The system 100 is configured for prioritizing and sorting the structured content 114 associated with the identified second set of content from knowledge base 112-A, based on one or more parameters. The content may enable learning by the student employing various learning modes 118 such as, videos, practice questions, reading material, tests, and the like.

A manner in which the prioritization module 116 of the recommendation system 100 of FIG. 1 operates for recommending the structured content 114 for use, by the learner 102 is described in detail further below.

Figure 2:
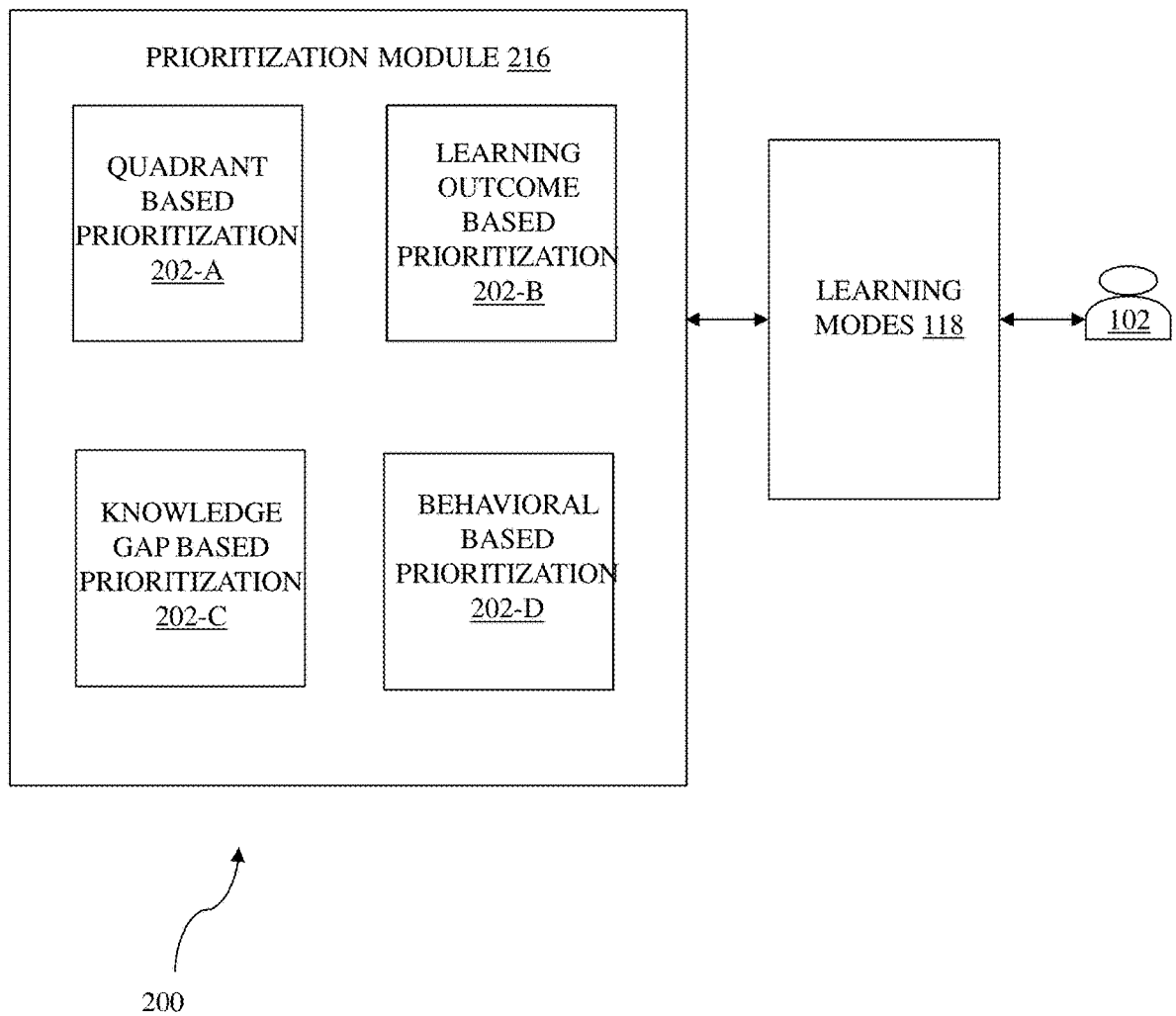
FIG. 2 illustrates the operation of a prioritization module of the system of FIG. 1 for recommending a structured content to the learner, according to an embodiment of the present disclosure.

FIG. 2 illustrates the operation of a prioritization module 200 of the system of FIG. 1 for recommending a structured content 114 for use, by a learner 102, according to an embodiment of the present disclosure. In particular, FIG. 2 illustrates various methods of prioritization of the structured content 114 associated with the identified second set of content from knowledge base 112-A for recommendation. The methods of prioritization include, but are not limited to, a quadrant based prioritization 202, a learning outcome based prioritization 204, a knowledge gap based prioritization 206, and a behavioral parameter based prioritization 208.

The objective of the recommendation system 100 is to deliver academic recommendations to learners 102 so as to promote maximize learning outcomes, user engagement, and user retention. Certain constraints, however, are in play. For example, constraints such as importance of the concept, difficulty level of the concept, available time (time available per day, time remaining for the examination, etc.), student's academic ability (for example, the students strengths and weaknesses that affect learning), and student's preferences of consuming content (visual learners prefer videos whereas readers may prefer learning material to read) are considered, to be able to recommend content to learners 102.

For example, the recommendation system 100 is configured for assisting in maximizing learning outcomes constrained by the time, difficulty level, and student ability. The paragraphs below explain, embodiments of the present disclosure for prioritization of the structured content 114 for providing recommendations to the learner 102.

The first embodiment includes a method referred to as Quadrant based prioritization 202 of the structured content 114 for recommending for use, by the learner 102 and it uses the strategy described below. Quadrant based prioritization 202 implements parameters such as the score assigned to the concept and the difficulty level of the concept for prioritization of the structured content 114 for providing recommendation to the learner 102.

As described above, the parameter is computed by assigning a score based on central concepts and assessment questions from preceding years for a particular content (identified sub-content). In one example, a score is assigned by classifying the concept as a central concept, a peripheral concept, the frequency of appearance of the concept in assessment questions from preceding years, and the like. Furthermore, for calculating the difficulty level of the concept, the content is categorized into several sets and experts allot the sets into categories such as EASY and DIFFICULT. In general, content exists within a context. One such contextualization of content is with respect to examinations, or more precisely, content has a weight based on its importance with reference to an examination. Also, it is more difficult to learn certain content than certain other content. Using these two orthogonal bases, namely difficulty and importance, the recommendation system 100 disclosed herein classifies content into a four quadrant grid as below:

Content that is IMPORTANT and is EASY
Content that is IMPORTANT and is DIFFICULT
Content that is NOT IMPORTANT and is EASY
Content that is NOT IMPORTANT and is DIFFICULT When recommending the structured content 114 to the learner 102, the recommendation system 100 disclosed herein, firstly recommends content from the (IMPORTANT, EASY) quadrant, and last from the (NOT IMPORTANT, DIFFICULT) quadrant. When deciding to recommend content from the remaining two quadrants, the recommendation system 100 disclosed herein may base that decision on student's academic ability. Student 102 with high academic ability may be recommended content from the (IMPORTANT, DIFFICULT) quadrant since they are capable of consuming that content. A student 102 with low academic ability may be recommended content from the (NOT IMPORTANT, EASY) quadrant.

The second embodiment for prioritization of the structured content 114 for providing recommendation for use, by the learner 102 includes a method called Learning Outcome Based Prioritization 204. The Learning Outcome Based Prioritization is based on the strategy described below.

When recommending the structured content 114 to the learner 102, the recommendation system 100 disclosed herein uses data on the impact that an adequate knowledge about each concept (represented by a node) of the knowledge base has on the learning outcome as measured by the performance measure (percentage marks, CPA, etc.) achieved by learners in the examination. For example, the historical data on the impact of studying a particular concept and its impact on the performance of a plurality of learners is measured. Based on the impact measured, in a collective fashion, the recommendation system 100 ranks the content 114, associated with one or more nodes (concepts) to recommend to the learner 102 in decreasing order of the nodes' impact on the learning outcome, for example.

The third embodiment for prioritization of structured content 114 for providing recommendation for use, by the learner 102 includes a method called Knowledge Gap Based Prioritization 206. The Knowledge Gap Based Prioritization 206 is based on the strategy described below.

When recommending the structured content 114 to the learner 102, the recommendation system 100 disclosed herein is configured for determining the proficiency of the learner 102 in learning the concept based on the gaps the learner 102 has in the knowledge with respect to that particular concept. The system 100 is configured for measuring a student's gaps in understanding and proficiency for specific knowledge nodes in the content topology. The recommendation system 100 ranks the structured content 114 to recommend to the learner 102 based on measurement of the student's knowledge gap with reference to a specific node (representing a concept) of the content topology. In one example, the student's knowledge gap with reference to a specific node is measured using the student's accuracy (score) across all questions tagged to that node. In another example, nodes where the student 102 has low accuracy (implying high knowledge gap) can be recommended over nodes where the student 102 has higher accuracy.

The fourth embodiment for prioritization of structured content 114 for providing recommendation for use, by the learner 102 includes a method called Behavioral Parameter Based Prioritization 208. The Behavioral Parameter Based Prioritization 208 is based on the strategy described below.

When recommending the structured content 114 to the learner 102, the recommendation system 100 disclosed herein is configured for considering the behavioral context of the learner 102 over a node (representing a concept) of the content topology to further rank the order of the structured content 114 to recommend to the learner 102. In one example, based on the student's behavioral parameters, the recommendation system 100 is configured for computing the deviation on each behavioral parameter for the user with respect to the average parameter value for each node in the content topology. The nodes with higher behavioral deviation can be recommended before nodes with lower behavioral deviation.

It is to be noted that the present disclosure is not limited to the methods or strategies of prioritization as described above and may also implement other suitable methods of ordering and prioritizing the structured content 114, for recommendation of content to a learner for use by the learner 102.

Using the methodologies and strategies of prioritization as described above, various learning modes 118 such as videos, practice questions, learning material, tests, and the like can also be recommended for use, by the learner 102. In one embodiment, the content is recommended using a suitable one or more learning modes 118 which are determined based on one or more of a the learner's ability, learner's preferences, content hygiene, effectiveness, and content topology. In one example, when choosing what learning modes 118 to recommend to the user 102, the recommendation system 100 disclosed herein uses criteria such as Student's ability, Student's preferences, Content Hygiene, Effectiveness, and Content Topology. For instance, when recommending the structured content 114 to the learner 102, the recommendation system 100 is configured to either display the structured content 114 to the learner 102, using an audio clip, an animated video, a live-stream or prerecorded video by an expert, a book of a specific publisher or author, practice questions, and the like.

The Student's ability and preferences are determined based on criteria such as, for example, visual learners may prefer videos as a learning mode whereas readers may prefer reading material. The Content Hygiene may include, for example, how complete and error free is the learning mode 118 for a learner, does a significant fraction of users 102 see the learning mode 118 and not consume it, etc. Furthermore, the impact of the learning mode used on a student's learning outcome may decides effectiveness. Lastly, the content topology comprises content (knowledge concepts) built on each other. Generally learners learn simpler concepts and use that knowledge to learn more complex concepts. This topological ordering of content is used to recommend content at the right level for the learner 102.

A manner in which the processor 108 in communication with the memory 110 comprising the knowledge base 112 of the system 100 operates for providing personalized solutions for recommending content to the learner 102 based on contextualized learner-specific content creation is described further with an example in detail below.

Figure 3A:
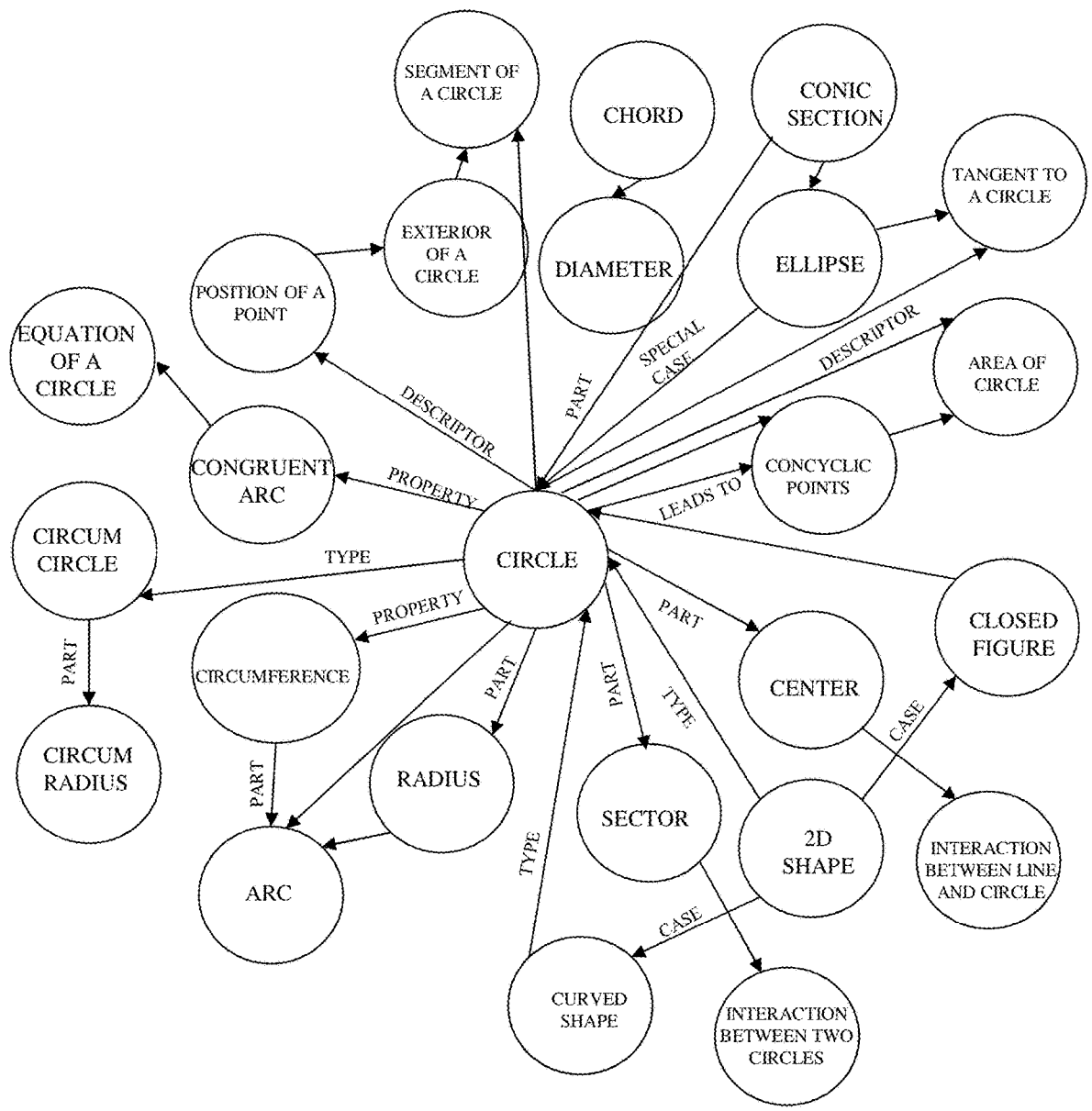
FIGS. 3A and 3B are an example representation of a subset of knowledge base illustrating a topology comprising a plurality of interlinked nodes, wherein each node is representing a concept, implemented according to an embodiment of the present disclosure.
Figure 3B:
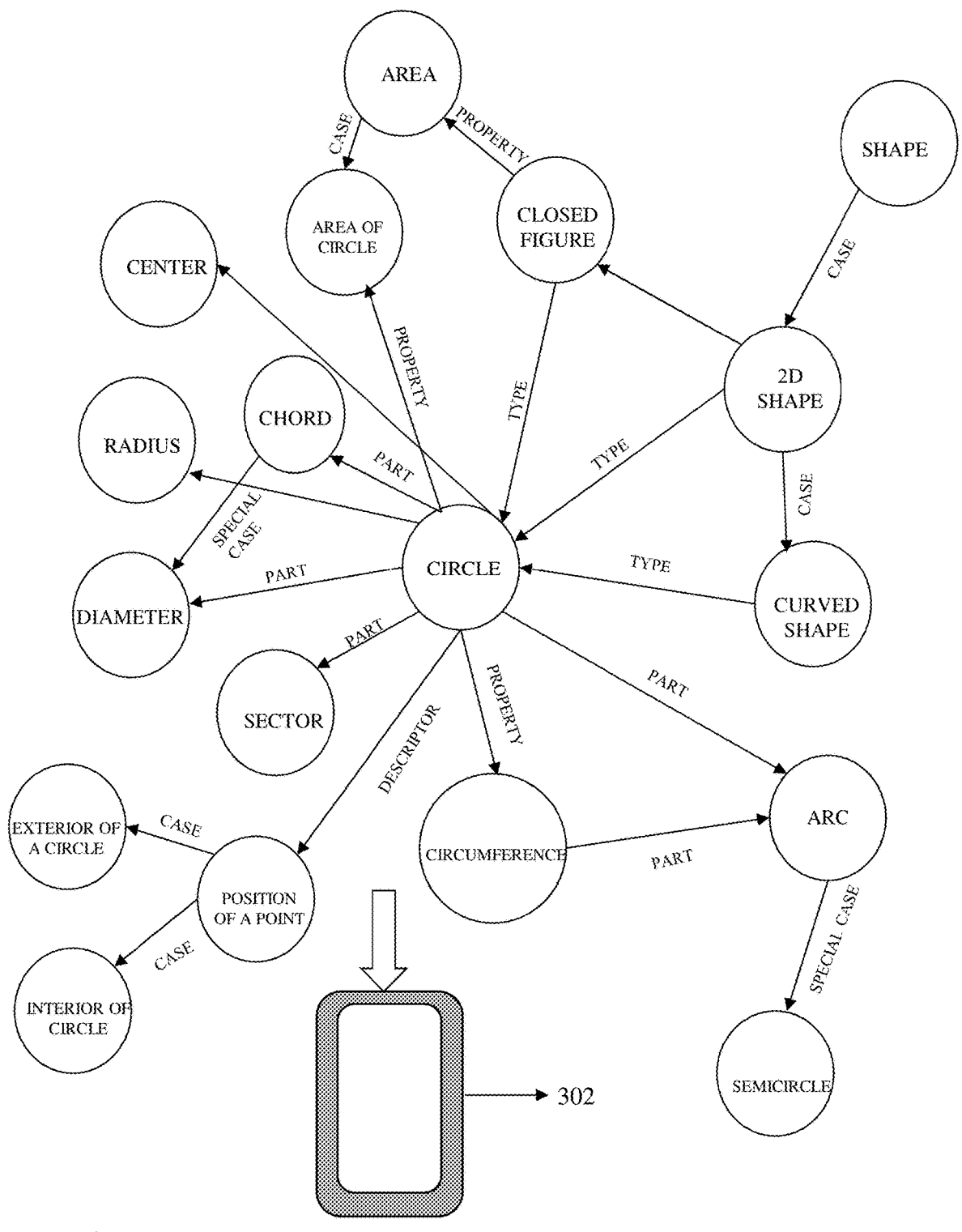

FIG. 3 is a graphical representation of a subset of knowledge base illustrating a topology comprising a plurality of interlinked nodes, wherein each node represents a concept, implemented according to an embodiment of the present disclosure. In particular, FIG. 3 is an illustration of a content topology 300-A comprising a context agnostic content and further illustrates a structured contextualized learner specific content 300-B based on the learning context of the learner 102.

It is to be noted that, FIG. 3 is merely a graphical representation of the exemplary concept, "circle". It is to be noted, however, that the disclosed method can be applied to other concepts knowledge base 112 and not limited only to "circle". As described above, the knowledge base 112 is in form of a topology comprising a plurality of interlinked nodes, wherein, each node represents a concept.

The knowledge base 112 is constructed based on concepts that depict the 'flow of learning' enabling an expert to answer one or more key questions. In one example, the key question may be what to study when in a limited time? In another example the key question may be, how is $8^{th}$ grade science connected to $10^{th}$ grade science? In yet another example the key question may be, how to set a good question paper? In yet another example the key question may be, how to bridge learning gaps from the preceding years?

In one exemplary embodiment, several factors of a learner 102 such as learning adaptability, learning needs, prior knowledge, and the amount of time a learner 102 can spend to learn a large amount of content, the age of the learner, pedagogy and many more such factors are considered while contextualizing various levels of the knowledge base 112.

With continued reference to FIG. 3, it is observed that the depth of the concept of "circle" is introduced to support multiple occurrences of the same concept at various depths (as shown by reference numeral 300-A. For example, "circle" can be presented to the user 102 at multiple depths. For example, the circle can be introduced to the learner 102 as a type of two dimensional shape, having the property of circumference, or as plane figure whose boundary (the circumference) Is a set of points equidistant from a fixed point called the center and so on.

Thus, the recommendation system 100 after contextualization based on the learning context assembles a structured content 114 for recommending for use, by the learner 102 on the user device 104, as shown by reference numeral 300-B. The recommendation system 100 facilitates the contextualization of the underlying concepts and relationships using the learning context. In one example, the learning context includes grade, goal, examination, subject, chapter, topic, etc., of the student. The recommendation system 100 disclosed herein also facilitates contextualization of the learning content using the consumption context of students. In one example, the consumption context of the student may include institute, publisher, books, device, connectivity, demography, etc. The recommendation system 100 disclosed herein enables the discovery of various learning paths, and its importance for a given learning context.

Figure 4:
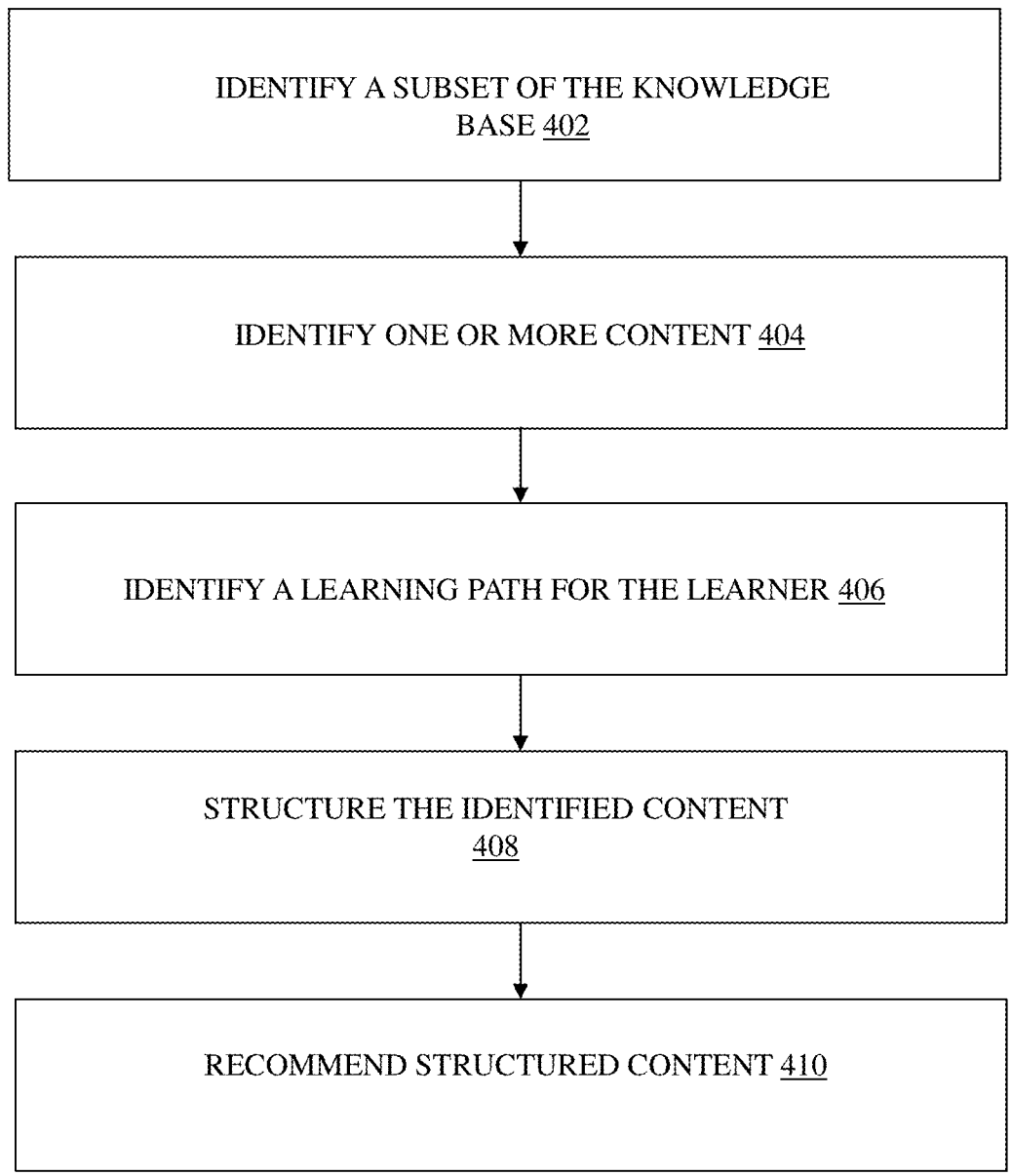
FIG. 4 is a flow chart illustrating a method for recommending content to a learner for use, according to an embodiment of the present disclosure.

FIG. 4 is a flow chart illustrating a method 400 for recommending content to a learner for use by the learner, according to an embodiment of the present disclosure. FIG. 4 may be described from the perspective of a processor 108 that is configured for executing computer readable instructions stored in a memory to carry out the functions of the modules (described below and not shown in the figures) of the system 100. In particular, the steps as described in FIG. 4 may be executed for recommending the structured content 114 through a user interface on the user device 104 for use, by the learner 102. In an exemplary embodiment, the content may be hosted on knowledge base 112. Each step is described in detail below.

At step 402, a subset of the knowledge base is identified, based on the academic context of the learner. The knowledge base, which hosts content, is an organized topology comprising a plurality of interlinked nodes, wherein, each node represents a concept. In one example, an identifier module (not shown) may be implemented for identifying the subset of the knowledge base, based on the academic context of the learner. In one example, the academic context of the learner is determined based on at least one of a learning context and a consumption context of the learner. In one exemplary embodiment, the learning context may be driven by data such as learner's grade and class, goal, and examination to be attended by the learner. The learning context invokes the appropriate depth and width of the concept of the content hosted on knowledge base. In another example, the consumption context for the learner may capture specific instances of publishers that the learner prefers, book and language preferences, institution in which the learner is pursuing education in, and the like.

At step 404, a first set of content tagged to one or more nodes of the subset of knowledge base is identified. Furthermore, a second set of content from the first set of content, based on the learner's behavioral context and characteristics of the learner is identified. In one example, an identifier module (not shown) may be implemented for identifying the first set of content and the second set of content. The second set of content is identified based on the learner's behavioral context and characteristics of the learner. The behavioral context of the learner is determined based on the behavioral attributes of the learner with reference to a node of the subset of the knowledge base relative to the behavioral attributes of each of a plurality of other learners, with reference to the node.

The one or more characteristics of the learner are determined based on, at least one of the academic ability of the learner, the behavioral attributes of the learner, the efforts expended by the learner for learning a particular concept and the learner's predisposition towards a concept.

At step 406, a learning path for the learner is identified. In one example, module (not shown) may be implemented for identifying a learning path for the learner, based on a learning strategy for the learner and a score assigned to a concept. The score is assigned to the concept based on its importance. Importance of a concept is computed by assigning a score, based on central concepts and previous year's papers for a particular content (identified sub-content). In one embodiment, the learning path is a path to learn a concept from the current state of student's ability on concepts.

At step 408, the identified second set of content is structured. In one example, a structuring module (not shown) may be implemented for structuring the second set of content for recommending to the learner, based on the identified learning path. The content is recommended to the learner, by sorting and prioritizing the content, based on one or more parameters associated with each of the content of the second set of content. The one or more parameters are determined based on at least one of the score assigned to the concept and difficulty level of the concept, measured impact on learning outcomes, proficiency of the learner in learning a concept, and the behavioral context of the learner.

At step 410, the structured content is recommended. In one example, the display device (not shown) is implemented for displaying of the structured content on the user device for use, by the learner. In one embodiment, the content is recommended using suitable one or more learning modes which are determined based on one or more of a learner's ability, learner's preferences, content hygiene, effectiveness, and content topology. For instance, when recommending the structured content to the learner, the recommendation system is configured for displaying the structured content to the learner, using an audio clip, an animated video, a live stream or prerecorded video by an expert, a book of a specific publisher, practice questions and the like.

Using the embodiments as described above, the content recommendation can be manifested in the following products. For example, the content recommendation can be manifested in personalized practice packs for generating a personalized set of questions for every user 102 that target specific weaknesses. In another example, the content recommendation can be manifested in Jump Packs for generating sets of questions. In yet another example, the content recommendation can be manifested in study search. In study search, all the widgets that are returned by the search engine on this recommendation system 100 are ranked using a combination of the strategy and learning modes 118 described above. Moreover, the recommendation system 100 may include a personalized conversational agent, often referred to as a chat bot that proactively recommends learning modes 118 to the users 102.

In order to operationalize the content recommendation, the recommendation system 100 facilitates the classification of the content considering a plurality of factors such as topology order, and connections between content (concepts), concept difficulty, concept depth, concept connection with various learning modes 118, and capturing of historical user data on engagement, retention and learning outcomes against all depths.

The topology order and connections between concepts include connections within chapter, across chapters, across grades and across subjects. The concept depth includes the capturing of various manifestations of the same concept across different grades. The concepts should be connected with various learning modes 118 (videos, practice questions, tests, reading material, etc.). Furthermore, the content needs to be classified or organised by capturing historical user data on engagement, retention, and learning outcomes against all depths.

These requirements are fulfilled by the recommendation system 100 disclosed herein by identifying the learning content hosted on knowledge base 112 for structuring the content using contextualization of a plurality of contextual elements 106-A-F.

Thus, the recommendation system 100 disclosed herein is configured for storing the underlying representation of knowledge where concepts are nodes and relationships between concepts are edges. The recommendation system 100 disclosed herein comprises a knowledge base that hosts learning content and users' historical activity data on content consumption and its impact on learning outcomes. The recommendation system 100 disclosed herein is multi-dimensional, wherein each concept has multiple depths based on how it is defined.

Figure 5:
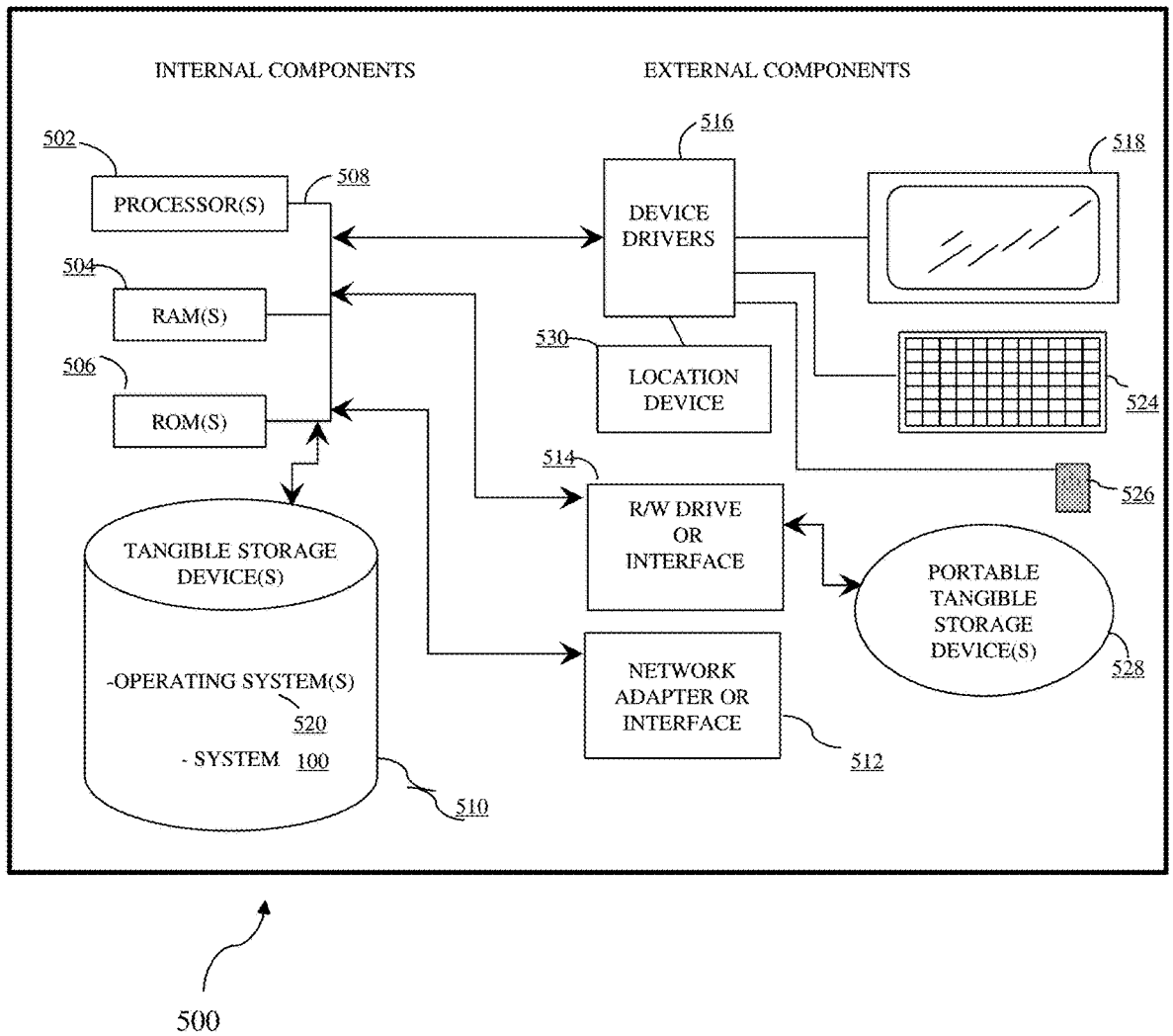
FIG. 5 is a block diagram of an electronic device, implemented according to an embodiment of the present disclosure.

FIG. 5 is a block diagram 500 for of a computing device utilized for implementing the system 100 of FIG. 1 implemented according to an embodiment of the present disclosure. The modules of the system 100 described herein are implemented in computing devices. The computing device 500 comprises one or more processor 502, one or more computer readable memories 504 and one or more computer readable ROMs 506 interconnected by one or more buses 508.

Further, the computing device 500 includes a tangible storage device 510 that may be used to execute operating systems 520 and modules existing in the system 100. The various modules of the system 100 can be stored in tangible storage device 510. Both, the operating system and the modules existing in the system 100 are executed by processor 502 via one or more RAMs 504 (which typically include cache memory).

Examples of storage devices 510 include semiconductor storage devices such as ROM 506, EPROM, EEPROM, flash memory, or any other computer readable tangible storage devices 510 that can store a computer programs and digital data. Computing device also includes R/W drive or interface 514 to read from and write to one or more portable computer-readable tangible storage devices 528 such as a CD-ROM, DVD, and memory stick or semiconductor storage device. Further, network adapters or interfaces 512 such as a TCP/IP adapter cards, wireless WI-FI interface cards, or 3G or 4G wireless interface cards or other wired or wireless communication links are also included in the computing device 500. In one embodiment, the modules existing in the system 100 can be downloaded from an external computer via a network (for example, the Internet, a local area network or other, wide area network) and network adapter or interface 512. Computing device 500 further includes device drivers 516 to interface with input and output devices. The input and output devices can include a computer display monitor 518, a keyboard 524, a keypad, a touch screen, a computer mouse 526, or some other suitable input device.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A system for recommending content, to at least one learner for use by the at least one learner, the system comprising a processor in communication with a memory, the memory storing a knowledge base, an academic context of the at least one learner, a behavioral context of the at least one learner, and a characteristic of the at least one learner, and the processor configured for:
- identifying a subset of the knowledge base, based on the academic context of the at least one learner, wherein the knowledge base is an arranged topology of a plurality of one or more interlinked nodes, wherein each node represents a concept;
- identifying a first set of content tagged to the interlinked nodes of the subset of the knowledge base;
- identifying a second set of content from the first set of content, based on the behavioral context of the at least one learner and the characteristic of the at least one learner;
- identifying a learning path for the at least one learner, based on a learning strategy for the at least one learner and a score assigned to a concept;
- structuring the identified second set of content for recommending to the at least one learner, based on the identified learning path, wherein structuring the identified second set of content for recommending to the at least one learner by sorting and prioritizing the content based on one or more parameters associated with each of the content of the second set of content; and
- recommending, by presenting the structured, contextualized, and personalized content, for use by the at least one learner, on a user interface of a user device associated with the at least one learner, wherein recommending structured, contextualized, and personalized content is suitable for one or more learning modes.

2. The system as claimed in claim 1, wherein the one or more parameters associated with each of content are determined, by the processor, based on at least one of a score assigned to the concept and a difficulty level of the concept, a measured impact on learning outcomes, a proficiency of the at least one learner in learning the concept, and the behavioral context of the at least one learner.

3. The system as claimed in claim 1, wherein the academic context of the at least one learner is determined, by the processor, based on at least one of a learning context and a consumption context of the at least one learner, wherein the learning context enables filtering of practice and assessment questions of a particular difficulty level, bloom level, and set of concepts at desired depth of the knowledge base, pertaining to the given academic context for the at least one learner.

4. The system as claimed in claim 1, wherein the behavioral context of the at least one learner is determined, by the processor, based on a behavioral attribute of the at least one learner with reference to a node of the subset of the knowledge base relative to the behavioral attributes of each of a plurality of other learners, with reference to the node.

5. The system as claimed in claim 1, wherein the characteristics of the at least one learner are determined, by the processor, based on at least one of, an academic ability of the at least one learner, the behavioral attributes of the at least one learner, an effort expended by the at least one learner for learning the concept and the at least one learner's predisposition towards a concept.

6. A computer implemented method for providing recommendations, the method comprising:
- providing, by a processor, through a user interface of a user device associated with an at least one learner, a structured content to the at least one learner for use by the at least one learner; wherein the processor is coupled to a memory, wherein the memory stores a plurality of modules to be executed by the processor, and wherein the plurality of modules are configured for:
- identifying a subset of a knowledge base, based on an academic context of the at least one learner, wherein the knowledge base is an arranged topology of a plurality of one or more interlinked nodes, wherein each node represents a concept;
- identifying a first set of content tagged to the interlinked nodes of the subset of the knowledge base;
- identifying a second set of content from the first set of content, based on a behavioral context of the at least one learner and a characteristic of the at least one learner;
- identifying a learning path for the at least one learner, based on a learning strategy for the at least one learner and a score assigned to a concept;
- structuring the identified second set of content for recommending to the at least one learner, based on the identified learning path, wherein structuring the identified second set of content for recommending to the at least one learner by sorting and prioritizing the content, based on one or more parameters associated with each of the content of the second set of content; and
- recommending, by presenting the structured, contextualized, and personalized content, for use by the at least learner, on the user interface of the user device associated with the at least one learner, wherein, recommending structured, contextualized, and personalized content is suitable for one or more learning modes.

7. The computer implemented method as claimed in claim 6, wherein the one or more parameters associated with each of content are determined based on at least one of a score assigned to the concept and a difficulty level of the concept, a measured impact on learning outcomes, a proficiency of the at least one learner in learning the concept, and the behavioral context of the at least one learner.

8. The computer implemented method as claimed in claim 6, comprising recommending content suitable for one or more learning modes based on one or more of a learner's ability, learner's preferences, content hygiene, effectiveness, and content topology.

9. The computer implemented method as claimed in claim 6, wherein the academic context of the at least one learner is determined based on at least one of a learning context and a consumption context of the at least one learner, wherein the learning context enables filtering of practice and assessment questions of a particular difficulty level, bloom level, and set of concepts at desired depth of the knowledge base, pertaining to the given academic context for the at least one learner.

10. The computer implemented method as claimed in claim 6, wherein the behavioral context of the learner is determined based on a behavioral attribute of the at least one learner with reference to a node of the subset of the knowledge base relative to the behavioral attributes of each of a plurality of other learners, with reference to the node.

11. The computer implemented method as claimed in claim 6, wherein the characteristics of the at least one learner is determined based on, at least one of an academic ability of the at least one learner, the behavioral attributes of the at least one learner, an effort expended by the at least one learner for learning the concept and the at least one learner's predisposition towards a concept.

* * * * *